（12）United States Patent
Driscoll

(10) Patent No.: US 8,442,934 B2
(45) Date of Patent: May 14, 2013

(54) QUERY AND RESULT REBINDING

(75) Inventor: Daniel J. Driscoll, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/888,297

(22) Filed: Sep. 22, 2010

(65) Prior Publication Data

US 2012/0072439 A1    Mar. 22, 2012

(51) Int. Cl.
*G06F 17/30*    (2006.01)
(52) U.S. Cl.
USPC ........................................... 707/602
(58) Field of Classification Search ........... 707/759–761
See application file for complete search history.

(56) References Cited

U.S. PATENT DOCUMENTS

| | | | |
|---|---|---|---|
| 5,504,885 A | 4/1996 | Alashqur | |
| 6,163,776 A | 12/2000 | Periwal | |
| 7,533,107 B2 | 5/2009 | Gupta et al. | |
| 7,693,900 B2 | 4/2010 | Wilmering et al. | |
| 2007/0027904 A1 | 2/2007 | Chow et al. | |
| 2007/0220059 A1* | 9/2007 | Lu et al. | 707/200 |
| 2009/0138437 A1 | 5/2009 | Krishnamoorthy et al. | |
| 2009/0287880 A1* | 11/2009 | Wright et al. | 711/114 |
| 2009/0319498 A1 | 12/2009 | Zabokritski et al. | |

OTHER PUBLICATIONS

R. Shaker et al., "A Rule Driven Bi-Directional Translation System for Remapping Queries and Result Sets Between a Mediated Schema and Heterogeneous Data Sources", Pub. Date 2002 (5 pages).
Mike P. Papazoglou et al., "A semantic meta-modelling approach to schema transformation", Published date: 1995 (pp. 113-121).

* cited by examiner

*Primary Examiner* — Baoquoc N To
(74) *Attorney, Agent, or Firm* — Workman Nydegger

(57) ABSTRACT

The metadata-based intermediation between two data sources. A computing system accesses a query message (e.g., a query or a query response). The query message is structured to be compatible with the first data source. The computing system uses metadata either directly, or indirectly through the execution of code referenced by the metadata to convert the query message into a semantically equivalent query message that is compatible with the second data source. If the query message were a query, then a query response may be acquired and the metadata may perhaps be used again to convert the query response into a form that is compatible with the first data source. In one embodiment, the conversion using the metadata is performed with the assistance of a framework, making changes to the conversion process as simple as perhaps just editing the metadata itself.

20 Claims, 4 Drawing Sheets

QUERY AND RESULT REBINDING

BACKGROUND

There are numerous available data sources that provide structured records in which each record contains named fields. Such data sources might be a database, a web service, or the like. For any given data source, a schema defines the structure for the data contained in that data source. In order to obtain information from a data source, a query is submitted to the data source, wherein the query is bound to the data source's schema. Query results are provided by a data source in response to a query.

Syntactically identical data sources share the same schemas, query structures, and results formats. Semantically identical data sources may not share the same schema, but the fields of the data source are trivially converted between data sources by, for example, simply renaming of the fields. For instance, one data source may have a field called "Name" which includes a full name, wherein another data source may have a field called "FullName" which also includes a full name.

Semantically similar data sources have at least some fields which are only loosely related in which they contain the same information, but not the same schema that defines the structure of that information. For instances, fields that serve a similar function may have different name and value ranges. For instance, one data source might contain a field "Customer Name" and another data source contains similar information but divided amongst two fields called "FirstName" and "LastName". As another example, one data source might contain fields called "StreetAddress", "Town", "State", and "Country" while another data source consolidates the information into a field called "Address".

Often, a query structured to obtain information from one data source is targeted instead at another data source. Accordingly, there are conventional mechanisms that convert queries and results between data sources that are not syntactically identical. For instance, one conventional solution converts queries and results between syntactically identical or semantically identical sources, but does not allow for more expressive conversions necessary for data sources which are only semantically similar.

In addressing query and result conversion for data sources that are only semantically similar, the approach has been to hard code conversions, by drafting code that is tailored specifically to conversions between specific data sources, and for specific fields.

BRIEF SUMMARY

At least one embodiment described herein relates to the intermediation between two data sources. A computing system accesses a query message (e.g., a query or a query response). The query message is structured to be compatible with the first data source. The computing system uses metadata either directly, or indirectly through the execution of code referenced by the metadata to convert the query message into a semantically similar query message that is compatible with the second data source. If the query message were a query, then a query response may be acquired and the metadata may perhaps be used again to convert the query response into a form that is compatible with the first data source. In one embodiment, the conversion using the metadata is performed with the assistance of a framework, making changes to the conversion process as simple as perhaps just editing the metadata itself.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the intermediation between two data sources is described. A computing system accesses a query message (e.g., a query or a query response). The query message is structured to be compatible with the first data source. The computing system uses metadata either directly, or indirectly through the execution of code referenced by the metadata to convert the query message into a semantically similar query message that is compatible with the second data source. If the query message were a query, then a query response may be acquired and the metadata may perhaps be used again to convert the query response into a form that is compatible with the first data source. In one embodiment, the conversion using the metadata is performed with the assistance of a framework, making changes to the conversion process as simple as perhaps just editing the metadata itself. First, some introductory discussion regarding computing systems will be described with respect to FIG. 1. Then, the embodiments of the metadata-based intermediation will be described with respect to FIGS. 2 through 5.

Figure 1:
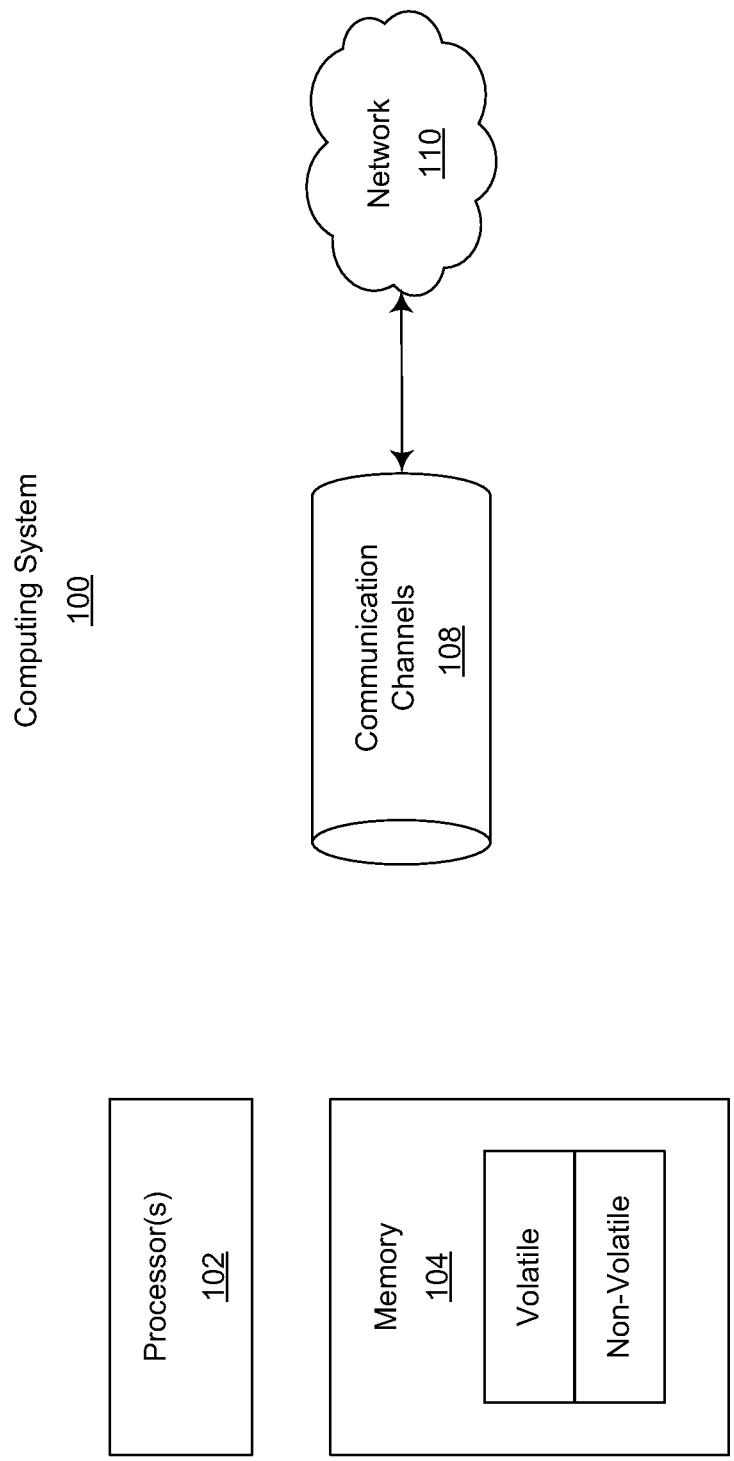
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
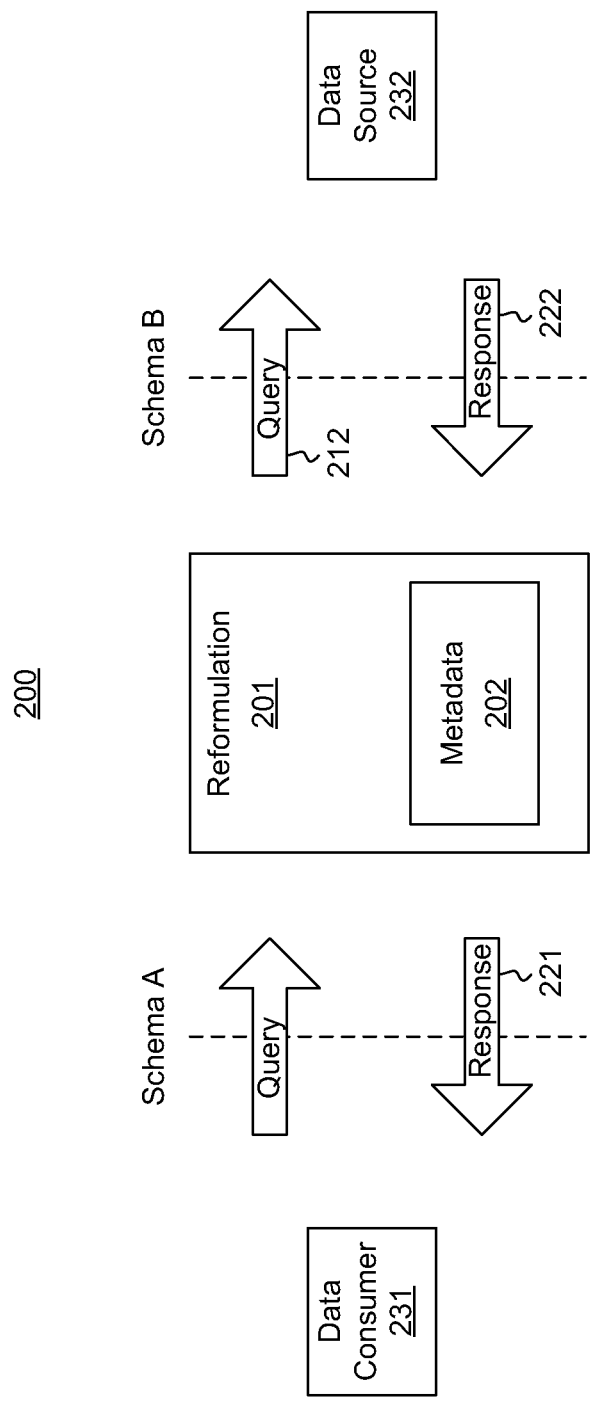
FIG. 2 illustrates an environment in which queries and query responses are reformulated to be compatible with different schemas suitable for different data sources.

FIG. 2 illustrates an environment 200 in which queries and query responses are reformulated to be compatible with different schemas suitable for different data sources. Communications in the left portion of FIG. 2, which traverse over the leftward dashed line are compatible with a first schema (i.e., "Schema A") perhaps used by a first data source. Communications in the right portion of FIG. 2, which traverse over the rightward dashed line are compatible with a second schema (i.e., "Schema B") perhaps used by a second data source.

The reformulation mechanism 201 receives a query from a data consumer 231, the query 211 being compatible with Schema A. The reformulation mechanism then reformulates the query 211 into a reformulated query 212 thereby changing the query so that it is compatible with Schema B. In the converse operation, when the response 222 to the query is received, the response is compatible with Schema B. The reformulation mechanism 201 reformulates the response 222 to create reformulated response 221, which is compatible with Schema A. From the viewpoint of the data consumer 231, the query was generated compatible with the Schema A, and the response was returned compatible with Schema A. The data consumers 231 need not be aware that other schemas and data sources were used to intermediate the query and query response.

Rather than having the reformulation process be hardcoded to each possible reformulation, the reformulation mechanism 201 uses metadata 202 (or custom runtime conversion code, or other expressions that relate Schema A and Schema B) to direct the reformulation process. When the reformulation processes needs to change, the metadata may be changed, without recoding the reformulation code. Instead, framework code may interpret the metadata to direct the reformulation process. The metadata may contain sufficient information that code intrinsic to the framework may perform the reformulation directly without reference to other code. Alternatively, the metadata may refer to code (or vice versa) that may be accessed by the framework to perform some or all of the reformulation process.

Figure 3A:
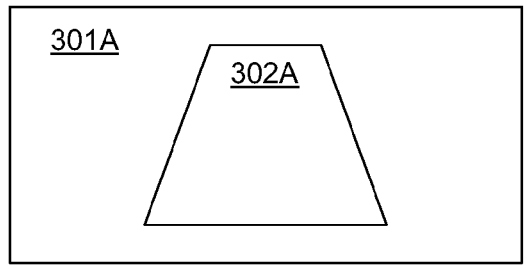
FIGS. 3A through 3C illustrate examples of various diverse data source environments in which the query and query response reformulation may benefit including FIG. 3A which illustrates a nested data source configuration, FIG. 3B which illustrates a parallel data source configuration, and FIG. 3C which illustrates a complex data source configuration.
Figure 3B:
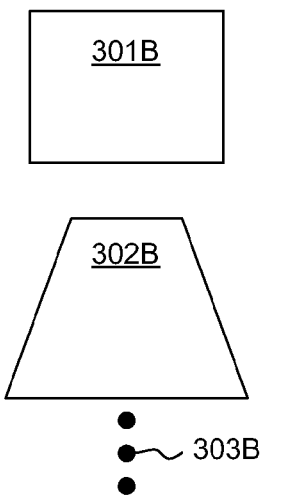
Figure 3C:
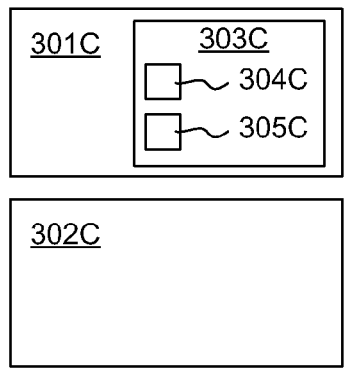

FIGS. 3A through 3C illustrates various example diverse data source configurations in which the environment 200 may operate. FIGS. 3A through 3C are provided to illustrates examples only, as the environment 200 may operate wherever it would be beneficial to convert a query message (such as a query or a query response) from one schema to another.

For example, FIG. 3A illustrates a nested data source that includes an external data source 301A and an internal data source 302A. Queries are initially received by the external data source 301A and follow a schema that is compatible with the external data source 301A. As part of information gathering necessary to formulate a response, the query is reformulated and submitted to the internal data source 302A. A reformulation environment 200 of FIG. 2 may perform the reformulation to make the query compatible with the second data source. When the data source 302A returns a response to the query, the reformulation environment 200 of FIG. 2 may reformulate the query response to be compatible with the schema followed by the external data source 301A. While FIG. 3A shows two nested tiers of data sources, multiple instances of the reformulation environment 200 of FIG. 2 may be used to support three or more nested tiers of data source involving perhaps multiple conversions of queries, and multiple conversions of query responses. Alternatively, the metadata may be flexible enough that a single conversion mechanism may be capable of converting queries and query responses amongst a larger number of schemas. In this case, the schema associated with each of the data sources may be different, yet the metadata is flexible enough to convert from any one of such schemas to any other one of such schemas to cover all permutations of possible conversions given the set of schemas in use.

FIG. 3B illustrates a parallel data source environment 300B in which at least two data sources are situated in parallel. When a query is received into the environment 300B, the query may be compatible with the data source 301B, but not the data source 302B. In that case the query may be provided directly to the data source 301B, but the environment 200 performs conversion of the query for the data source 302B. Likewise, the query response from the data source 301B perhaps does not need conversion to be understood to be in response to the original query, but the query response from the data source 302B is converted back to be compatible with the data source 301B so that it can be understood to be a response to the original query. The ellipses 302C represents that there may be more than two data sources in parallel in the environment 300B.

FIG. 3C illustrate a more complex structure 300C of data sources including combinations of parallel and nested data sources. For instance, data sources 301C and 302C are in parallel. Data source 303C is nested within data source 301C. Data sources 304C and 305C are nested within data source 303C and in parallel with each other. One or more instances of the reformulation environment 200 of FIG. 2 may be used to provide the appropriate query and query response reformulation to allow proper channels of communication of each query into the target data source(s) and communication the query response back to reply to the original query.

However, there may be other structures of data sources other than those illustrated in FIGS. 3A through 3C. As a further example, perhaps one data source hides another data source, even though the two data sources are separate. As another example, perhaps all of the data sources are accessible.

Figure 4:
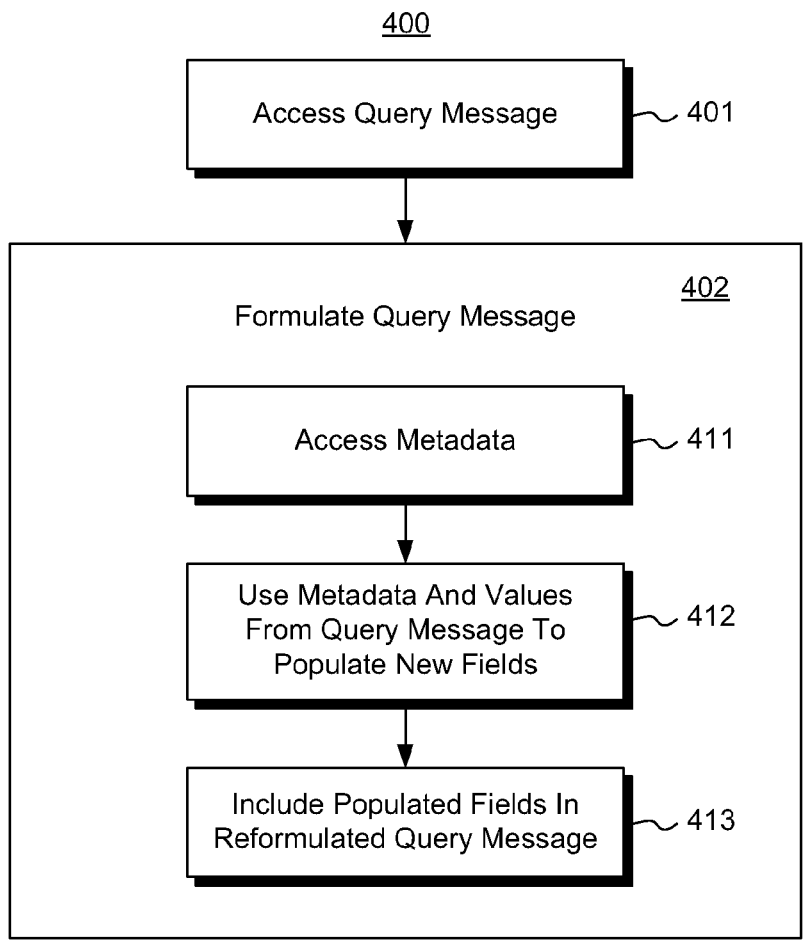
FIG. 4 illustrates a flowchart of a method of a computing system to reformulate a query message to form a reformulated semantically similar query message using metadata, where the query message may be a query or a query response.

FIG. 4 illustrates a flowchart of a method 400 of a computing system to reformulate a query message to form a reformulated semantically similar query message using metadata. The method 400 may be performed in the context of the reformulation environment 200 of FIG. 2, and thus will now be described with frequent reference to FIG. 2.

Figure 5:
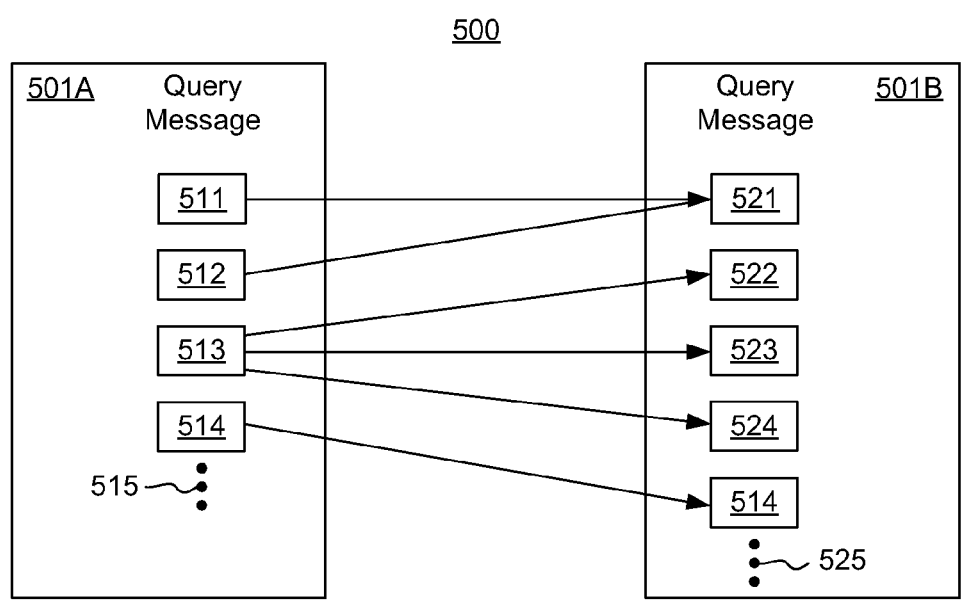
FIG. 5 illustrates an example data structure reformulation of a query message that includes multiple data fields that are compatible with a first schema into a query message that includes multiple data fields that are compatible with a second target schema.

The method 400 is initiated when a computing system accesses a query message (act 401). The query message may be a query or a query response, but nevertheless is structured to be compatible with a first schema followed by a first data source. For example, FIG. 5 illustrates an example data structure of a query message before reformulation (i.e., query message 501A) and after reformulation (i.e., query message 501B). In this act 401, the accessed query message is the query message 501A prior to reformulation.

The query message 501A is illustrated as abstractly including three fields 511, 512, 513 and 514 amongst potentially others as represented by the ellipses 515. Although the query message 501A is illustrated as including four fields, this is an example only. The query message 501A may contain any number of fields and still be subject to reformulation in accordance with the principles described herein. For discussion purposes only, suppose the schema followed by the query message 501A includes a name of a person, and that field 511 is a given name field, and that field 512 is a last name field. Suppose further that field 513 is an address field specifying a full address for the person. Now suppose that field 514 is a globally unique identifier associated with the person.

The method 400 then includes an act of reformulating the query message so as to be structured to be compatible with a second data source (act 402). The schema of the second data source may have different fields, but perhaps contain the same information as the first data source. For instance, reformulated query message 501B of FIG. 5 shows that the schema of the second data source include five fields 521 through 524 and 514 that contain similar information as the fields 511 through 514 of the original query message 501A. Once again, ellipses 525 represent flexibility in the actual number of fields within the reformulated query message.

For example, field 521 might be a name field that contains the full name of a person. Fields 522 through 524 might together specify an address for the person. For instance, suppose field 522 was a street address field, field 523 was a state or province field, and field 524 was a country field. Field 514 is a Globally Unique IDentifier (GUID) and is the same property and value as was in the original query message 501A. In that case, the reformulation is simply a pass through of the property/value pair.

In order to perform the reformulation of act 402, the computing system accesses metadata that correlates the fields of the first schema and the second schema (act 411). The metadata and the values of the original query message are then used to populate fields for the second schema compatible with the target data source. For instance, the metadata may describe that when encountering a combination of one or more fields of the original schema, that a corresponding set of one or more fields of a different schema is to be created, and specify how the new field(s) are to be populated based on the values of the original field(s).

As an example, the metadata may specify that when encountering a first name and last name field (e.g., fields 511 and 512), that a name field in the target schema is to be created (e.g., field 521) and that the value of that new field is to be populated with a concatenation of the values from fields 511 and 512. Likewise, the metadata might also specify that when encountering the address field 513, that three fields (e.g., street address field 522, state or province field 523, and country field 524) are to be created. The metadata might also specify or reference code that performs the separation of the value from field 513 into appropriate values for each of the individualized new fields (e.g., target fields 522, 523 and 524). For instance, the metadata might instruct the framework to evaluate whether there is a known country name in the final portion of the text value from the address field. If so, the country field 524 is populated with that text portion. If not, the country field 524 may be left blank or perhaps assigned a default value. The metadata might specify that the next prior text is observed to evaluate whether the text describes a known state or province for the identified country. That identified text may be used to populate the state or province field 523. The metadata, or code that the metadata references, may then describe that the remainder of the text from address field 513 is used to populate the street address field 522.

The populated fields are included within the reformulated form of the query message (act 413). The fields may be created within a reformulated form of the query message before or after the fields are populated.

This method 400 may be performed for both the query and the query response. For instance, suppose query message 501A and 501B were the original query. The query might have been for a list of people by the name of John Doe that reside in a particular state in the United States. The query response might include the address for each John Does in that state presented in a single list field. To present this data in a form that is recognized by the same schema as the original query, the metadata might specify that a new person field is to be created for each person in the list, and that each value from each item in the list is to be populated into a corresponding field that is dedicated for the list. Thus, a single list field (having 15 listed addresses) in the query response might be converted into perhaps 15 address fields 513 in which each address for "John Doe" is listed separately in a distinct address field.

Note, however, the this relationship does not have to be uniform in both directions. For example, consider the case where student grades are represented as numeric values in one schema and letter values in the other. The conversion from numeric to letter values would be perfect (i.e., lossless), but the conversion in the other direction would have to be lossy since it is ambiguous what the numeric value should be given the letter value. In other cases, we could support showing results but not support queries.

As previously mentioned, the metadata may itself specify the transformation that is to occur by giving all the parameters that the framework needs to perform the reformulation. In other words, the metadata may describe sufficient information regarding the relationship between the first particular set of data fields in the original query message and the second set of data fields in the reformulated query message that the framework alone can perform the population of the second particular set of one or more fields. Alternatively or in addition, the metadata may direct the framework to additional code to be executed by the framework in order to formulate and populate of the second particular set of one or more fields.

Accordingly, the principles described herein permit for flexible metadata-based intermediation between two semantically equivalent data sources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a computing system to reformulate a query message to form a reformulated semantically similar query message using metadata, the method comprising:
   a computing system accessing a query message that is structured to be compatible with a first data source, the query message including a set of one or more fields including at least a first particular set of one or more fields which are defined by a first schema of the first data source;
   reformulating the query message so as to be structured to be compatible with a second data source, wherein the second data source does not have the first particular set of one of more fields, but does have a second particular set of one or more fields that contain similar information as the first particular set of one or more fields, the second particular set of one or more fields being defined by a second schema of the second data source,
   wherein reformulating includes at least the following:
      accessing metadata that correlates the first particular set of one or more fields defined by the first schema and the second particular set of one or more fields defined by the second schema such that the metadata may be used to translate data and fields between the first and second set of one or more fields;
      an act of using the accessed metadata and the values of the first particular set of one or more fields to populate the second particular set of one or more fields; and
      creating a reformulated form of the query message which includes the populated second particular set of one or more fields such that the reformulated form of the query message may be executed against the second data source.

2. The method in accordance with claim 1, wherein the query message is a query.

3. The method in accordance with claim 2, wherein the second data source is contained within the first data source.

4. The method in accordance with claim 2, further comprising:
   an act of obtaining a query response from the second data source, the query response being compatible with the second data source; and
   an act of using the metadata to reformulate the query response so as to be structured to be compatible with the first data source.

5. The method in accordance with claim 4, wherein the act of using the metadata to reformulate the query response so as to be structured to be compatible with the first data source comprises:

an act of using the accessed metadata and the values of a third particular set of one or more fields to populate a fourth particular set of one or more fields; and an act of including the populated fourth particular set of one or more fields in a reformulated form of the query response.

6. The method in accordance with claim 5, wherein a framework and the metadata are used to perform the reformulation of the query and the query response.

7. The method in accordance with claim 6,
wherein for one of the query or the query response, the metadata describes sufficient information that the framework alone can perform the population of the second particular set of one or more fields,
where for the other of the query or the query response, the metadata references additional code to be executed by the framework in order to formulate and populate of the second particular set of one or more fields.

8. The method in accordance with claim 1, wherein the query message is a query response.

9. The method in accordance with claim 1, wherein a framework is used along with the metadata to perform the reformulation.

10. The method in accordance with claim 9, wherein the metadata describes sufficient information regarding the relationship between the first particular set of data fields and the second set of data fields that the framework alone can perform the population of the second particular set of one or more fields.

11. The method in accordance with claim 9, wherein the metadata references additional code to be executed by the framework in order to formulate and populate of the second particular set of one or more fields.

12. A computer program product comprising one or more computer storage devices having stored thereon computer-executable instructions that are structured such that, when executed by one or more processors of a computing system, the computing system is caused to perform a method of reformulating a query message that is structured to be compatible with a first data source to form a reformulated semantically similar query message to be compatible with a second data source, the query message including a set of one or more fields including at least a first particular set of one or more fields which are defined by a first schema of the first data source, wherein the second data source does not have the first particular set of one of more fields, but does have a second particular set of one or more fields that contain similar information as the first particular set of one or more fields, the second particular set of one or more fields being defined by a second schema of the second data source, the method comprising:
accessing metadata that correlates the first particular set of one or more fields defined by the first schema and the second particular set of one or more fields defined by the second schema such that the metadata may be used to translate data and fields between the first and second set of one or more fields;
using the accessed metadata and the values of the first particular set of one or more fields to populate the second particular set of one or more fields; and
creating a reformulated form of the query message which includes the populated second particular set of one or more fields such that the reformulated form of the query message may be executed against the second data source.

13. The computer program product in accordance with claim 12, wherein the query message is a query.

14. The computer program product in accordance with claim 13, the method further comprising:
an act of obtaining a query response from the second data source, the query response being compatible with the second data source; and
an act of using the metadata to reformulate the query response so as to be structured to be compatible with the first data source.

15. The computer program product in accordance with claim 14, wherein the act of using the metadata to reformulate the query response so as to be structured to be compatible with the first data source comprises:
an act of using the accessed metadata and the values of a third particular set of one or more fields to populate a fourth particular set of one or more fields; and
an act of including the populated fourth particular set of one or more fields in a reformulated form of the query response.

16. The computer program product in accordance with claim 15, wherein a framework and the metadata are used to perform the reformulation of the query and the query response.

17. The computer program product in accordance with claim 12, wherein the query message is a query response.

18. The computer program product in accordance with claim 12, wherein a framework and the metadata are used to perform the reformulation, wherein the metadata describes sufficient information regarding the relationship between the first particular set of data fields and the second set of data fields that the framework alone can perform the population of the second particular set of one or more fields.

19. The computer program product in accordance with claim 12, wherein a framework and the metadata are used to perform the reformulation, wherein the metadata references additional code to be executed by the framework in order to formulate and populate of the second particular set of one or more fields.

20. A method of a computing system for intermediating between a first and second data source, the method comprising:
a computing system accessing a query that is structured to be compatible with a first data source, the query including a set of one or more fields including at least a first particular set of one or more fields which are defined by a first schema of the first data source;
reformulating the query so as to be structured to be compatible with a second data source, wherein the second data source does not have the first particular set of one of more fields, but does have a second particular set of one or more fields that contain similar information as the first particular set of one or more fields, the second particular set of one or more fields being defined by a second schema of the second data source,
wherein reformulating includes at least the following:
accessing metadata that correlates the first particular set of one or more fields defined by the first schema and the second particular set of one or more fields defined by the second schema such that the metadata may be used to translate data and fields between the first and second set of one or more fields;
using the accessed metadata and the values of the first particular set of one or more fields to populate the second particular set of one or more fields; and
creating a reformulated form of the query message which includes the populated second particular set of one or more fields such that the reformulated form of the query message may be executed against the second data source;

obtaining a query response from the second data source in response to executing the reformulated form of the query message, the query response being compatible with the second data source and comprising fields defined by the second schema; and using the metadata to reformulate the query response so as to be structured to be compatible with the first data source such that the reformulated the query response appears as if it is a response from the first data source.

\* \* \* \* \*